UNITED STATES PATENT OFFICE.

MOSES OTTENHEIMER AND LOUIS OTTENHEIMER, OF BALTIMORE, MD.

IMPROVEMENT IN PROCESSES OF PRESERVING MEATS.

Specification forming part of Letters Patent No. 196,929, dated November 6, 1877; application filed October 24, 1877.

*To all whom it may concern:*

Be it known that we, MOSES OTTENHEIMER and LOUIS OTTENHEIMER, of the city of Baltimore, in the county of Baltimore and State of Maryland, have invented certain new and useful Improvements in the Process of Preserving Meat; and we do hereby declare that the following is a full, clear, and exact description thereof, which will enable others skilled in the art to which it appertains to make and use the same.

The nature of our invention consists in a new and improved manner of preserving beef in such manner that all blood, impurities, veins, sinews, &c., are entirely removed and extracted.

The beef is killed upon the Jewish principle, and is clean and healthy when prepared as an article of food by the hereinafter-described treatment of beef and other meats killed for the Hebrew market. The beef thus killed, when dressed and ready for market or use in a raw state, is immersed in water for about half an hour. It is then taken out of the water and put in dry salt for about one hour, after which it is taken out of the salt and thoroughly cleansed, washed, and chopped up fine. The beef is then ready to receive the spices, which are rubbed in in the usual manner.

As an illustration, we will say that to ten pounds of beef, prepared as above stated, we add two ounces of ground black pepper, one ounce of ground red pepper, one ounce of ground cloves, one ounce of laurel-leaves, one ounce of garlic chopped fine, and four ounces of fine salt. Each is to be applied separately, and then the whole is thoroughly mixed. The whole mixture is then put into a can or vessel, in which it is compressed. This vessel is then put into a boiler of boiling water or steam, and kept there half an hour, the lid of the vessel containing the meat being removed at the time and while the boiling process is in operation, the object being to force out any and all the foul air or extraneous matter that would otherwise remain. While yet hot, the lid of the vessel or can is put on and hermetically sealed. After this operation it is put back into the boiler and boiled two hours. After this the vessel or can containing the meat is taken out of the boiler and allowed to be sufficiently cooled; then it is ready for use as food. The foregoing process is necessary to be gone through with in all sizes of cans, from a one-pound can to a hundred-pound can.

It may be observed that the quantities of the various ingredients constituting the compound above described may be varied according to the taste without departing from the spirit of our invention; and we do not, therefore, confine ourselves to the exact quantities, as hereinbefore described.

It may also be observed that the meat preserved in this manner will keep in any climate to any reasonable length of time.

We are aware that meat has been cooked and mixed with spices, then heated and compressed into cans for shipment, but not according to the manner and principle that we have described, and we therefore do not claim such.

What we do claim, and desire to secure by Letters Patent, is—

In the preparation of meat upon the Hebrew plan, the process of preserving the same by cleansing, salting, washing, preserving by spices, canning, and heating, in the manner and for the purpose substantially as herein described.

In testimony that we claim the foregoing as our own we affix our signatures in presence of two witnesses.

MOSES OTTENHEIMER.
    LOUIS OTTENHEIMER.

Witnesses:
 JOHN W. TAYLOR,
 E. B. DUVALL, Jr.